United States Patent
Yano et al.

(10) Patent No.: US 11,246,325 B2
(45) Date of Patent: Feb. 15, 2022

(54) PACKED COFFEE BEVERAGE CONTAINING FURFURYL METHYL SULFIDE

(71) Applicant: SUNTORY HOLDINGS LIMITED, Osaka (JP)

(72) Inventors: Taro Yano, Kanagawa (JP); Ryosuke Sugino, Kanagawa (JP); Daigo Ibusuki, Kanagawa (JP); Chihiro Iwasa, Kanagawa (JP); Nobuhiro Ito, Kanagawa (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 156 days.

(21) Appl. No.: 16/493,765

(22) PCT Filed: Mar. 14, 2018

(86) PCT No.: PCT/JP2018/009974
§ 371 (c)(1),
(2) Date: Sep. 13, 2019

(87) PCT Pub. No.: WO2018/168928
PCT Pub. Date: Sep. 20, 2018

(65) Prior Publication Data
US 2020/0128845 A1    Apr. 30, 2020

(30) Foreign Application Priority Data

Mar. 14, 2017  (JP) .............................. JP2017-049221
Mar. 31, 2017  (JP) .............................. JP2017-070493

(51) Int. Cl.
*A23F 5/46*    (2006.01)
*A23L 27/20*   (2016.01)
*A23L 27/28*   (2016.01)

(52) U.S. Cl.
CPC .......... *A23F 5/465* (2013.01); *A23L 27/2022* (2016.08); *A23L 27/2052* (2016.08); *A23L 27/28* (2016.08)

(58) Field of Classification Search
CPC .. A23F 5/465; A23L 27/2022; A23L 27/2052; A23L 27/28
USPC ......................................................... 426/594
See application file for complete search history.

(56) References Cited

U.S. PATENT DOCUMENTS

2007/0215625 A1 * 9/2007 Schmidtner ........ B65D 43/0208
                                                   220/713

FOREIGN PATENT DOCUMENTS

| JP | 2008259472 A | * | 10/2008 | ......... A23L 27/2022 |
|----|--------------|---|---------|------------------------|
| JP | 2009-023964 A |   | 2/2009 |  |
| JP | 2009-291088 A |   | 12/2009 |  |
| JP | 2009291088 A | * | 12/2009 |  |
| JP | 2010-017126 A |   | 1/2010 |  |
| JP | 2010017126 A | * | 1/2010 |  |
| JP | 2016-192971 A |   | 11/2016 |  |
| KR | 100488409 B1 | * | 5/2005 |  |
| WO | WO-2008/129956 A1 |   | 10/2008 |  |
| WO | WO-2016104810 A1 | * | 6/2016 | ............... A23F 3/20 |

OTHER PUBLICATIONS

Aroma Chemistry, The Aroma of Coffee, Compound Interest, www.compoundchem.com. (Year: 2015).*
Translation of WO-2016104810-A1 (Year: 2016).*
Translation of KR-100488409-B1 (Year: 2005).*
Translation of JP-2010017126-A (Year: 2010).*
Translation of JP-2008259472-A (Year: 2008).*
Translation of JP-2009291088-A (Year: 2009).*
European Patent Office, Extended European Search Report for European Patent Application No. 18766878.5, dated Nov. 12, 2020.
International Search Report dated Apr. 10, 2018 for PCT/JP2018/009974.

* cited by examiner

*Primary Examiner* — Brent T O'Hern
(74) *Attorney, Agent, or Firm* — Faegre Drinker Biddle & Reath LLP

(57) ABSTRACT

A coffee beverage having, regardless of a liquid temperature of the beverage, reduced bitterness and little aftertaste is provided. The content of guaiacol and the content of furfuryl methyl sulfide in the beverage are adjusted to specific ranges.

9 Claims, No Drawings

PACKED COFFEE BEVERAGE CONTAINING FURFURYL METHYL SULFIDE

CROSS REFERENCES TO RELATED APPLICATIONS

This application is the National Stage of International Application No. PCT/JP2018/009974 filed Mar. 14, 2018, and claims benefit of Japanese Application No. 2017-070493 filed on Mar. 31, 2017 and Japanese Application No. 2017-049221 filed on Mar. 14, 2017.

TECHNICAL FIELD

The present invention relates to a packed coffee beverage. More specifically, the present invention relates to a packed coffee beverage having, regardless of the liquid temperature, reduced bitterness and little aftertaste, as well as to a production method for the coffee beverage, and the like.

BACKGROUND ART

A coffee beverage is widely enjoyed as a luxury, and the demand is increasingly growing while the needs are further diversifying. For example, there is a need for a coffee beverage having lingering bitterness unique to coffee. Meanwhile, there is also a need for a coffee beverage having reduced bitterness unique to coffee and thus having little aftertaste. Moreover, the product forms of coffee beverages exist variously from beverages to be heated to beverages to be stored at ambient temperature. Under such circumstances, consumers can choose coffee beverages in product forms that correspond to their own preference and/or their consumption modes, such as places or time to drink. For example, a mode of drinking a coffee beverage while walking or a mode of drinking a coffee beverage in small portions over a long time during work or break time is also prevalent.

In the existing coffee beverages developed as beverages to be heated, the taste and/or flavor of the beverages have been designed on the premise that the beverages in the heated state would be consumed. Meanwhile, consumers of such coffee beverages are normally living at ambient temperature, and naturally, the coffee beverages during consumption are also kept at ambient temperature. Moreover, due to the recent diversified consumption modes of coffee beverages as mentioned above, a case in which coffee beverages are consumed over a long time is not rare. In this case, even the liquid temperature of coffee beverages sold at around 60° C., for example, inevitably declines during storage or consumption. Here, the human tongue tends to perceive characteristically and typically bitter components more intensely at ambient temperature than at a high temperature, compared with other components. However, there has been little idea of producing a coffee beverage having reduced bitterness and little aftertaste not only at a high temperature but also at ambient temperature, in other words, regardless of the liquid temperature.

It is reported that some of aroma components decrease over time after production of a coffee beverage, thereby changing the aroma balance of the coffee beverage (Non Patent Literature (NPL) 1). NPL 1 also reports an attempt to reduce changes in the aroma balance of a coffee beverage over the passage of time by adding components that contribute to the aroma of the coffee beverage. Meanwhile, it is reported that 2-furfurylthiol, 3-mercapto-3-methylbutyl formate, and 3-methyl-2-butene-1-thiol, and the like, which are components that particularly contribute to the freshly brewed flavor of coffee, rapidly disappear after brewing of coffee (NPL 2). In particular, NPL 3 reports that 2-furfurylthiol is an especially important component in imparting freshly brewed flavor, but is rapidly lost by binding to melanoidins, which are water-soluble components of coffee. Further, it is also reported that the amount of aroma components, such as 2-furfurylthiol and 3-mercapto-3-methylbutyl formate, also decreases by heat sterilization of canned coffee beverages and that 2-furfurylthiol significantly decreases even at a typical pH (around 6) of coffee beverages (NPL 4).

Further, Patent Literature (PTL) 1 reports, for example, that coffee extracts that are rich in sweet flavor and have little aftertaste can be obtained by controlling the content ratio of pyrazine derivatives and guaiacol derivatives in the coffee beverages within specific ranges. Meanwhile, PTL 2 reports that the aroma is readily perceived during opening and consumption of coffee beverages by increasing a ratio of high volatile coffee aroma compounds (methanethiol and the like) to low volatile coffee aroma compounds (guaiacol and the like). Moreover, PTL 3 discloses that freshly brewed flavor of coffee can be imparted by adding furfuryl methyl sulfide, 2-furfuryl methyl disulfide, and the like.

CITATION LIST

Patent Literature

PTL 1: Japanese Unexamined Patent Application Publication No. 2011-125289
PTL 2: Japanese Unexamined Patent Application Publication (Translation of PCT Application) No. 2016-540512
PTL 3: Japanese Unexamined Patent Application Publication No. 2008-259472

Non Patent Literature

NPL 1: European Food Research and Technology, 211, 272-276 (2000)
NPL 2: Journal of Agricultural and Food Chemistry, 49(5), 2382-2386 (2001)
NPL 3: Journal of Agricultural and Food Chemistry, 50(2), 319-326 (2002)
NPL 4: Journal of Agricultural and Food Chemistry, 51(9), 2674-2678 (2003)

SUMMARY OF INVENTION

Technical Problem

None of the above literature discloses that changes in bitterness due to the passage of time after opening and/or due to changes in liquid temperature are taken into account in designing products. An object of the present invention is to provide a packed coffee beverage having, regardless of a liquid temperature of the beverage, reduced bitterness and little aftertaste. The majority of conventional packed coffee beverages are small-volume beverages of about 180 to 250 g per bottle. This is because such beverages are assumed to be consumed immediately after opening. Accordingly, such beverages have been designed to become comparable to regular coffee by focusing on the body of coffee and/or freshly brewed flavor of coffee. However, as flavored water has become common in recent years, there has been a growing need for large-volume beverages of about 500 g or more with high drinkability or the quality that enables gulping of a large-volume beverage. However, conventional packed coffee beverages lack products that meet such a need.

Solution to Problem

The present inventors continued intensive studies to meet the above-mentioned need. As a result, it was found that the effect of reducing bitterness by furfuryl methyl sulfide varies depending on temperature, in other words, furfuryl methyl sulfide specifically exhibits the effect of reducing bitterness at ambient temperature. Moreover, the present inventors found, for example, that by adjusting the guaiacol content and the furfuryl methyl sulfide content in a packed coffee beverage within specific ranges, it is possible to provide a coffee beverage having reduced bitterness and little aftertaste not only at a high temperature but also at ambient temperature, in other words, regardless of a liquid temperature of the beverage as well as to provide a coffee beverage with high drinkability due to reduced bitterness and little aftertaste, thereby accomplishing the present invention.

The present invention relates to, but is not limited to, the following matters.
(1) A packed coffee beverage having:
 a content of guaiacol of 10 to 600 µg/L; and
 a content of furfuryl methyl sulfide of 22 to 1,000 µg/L.
(2) The packed coffee beverage according to (1), further satisfying at least one of (i) to (iv) below:
 (i) a content of p-ethylphenol in the beverage is 2 to 20 µg/L;
 (ii) a content of p-cresol in the beverage is 2 to 20 µg/L;
 (iii) a content of phenol in the beverage is 50 to 1,100 µg/L; and
 (iv) a content of 2-acetylpyrrole in the beverage is 300 to 1,500 µg/L.
(3) The packed coffee beverage according to (1) or (2), where the content of guaiacol in the beverage is 100 to 500 µg/L.
(4) The packed coffee beverage according to any one of (1) to (3), further satisfying at least one of (v) to (vii) below:
 (v) a content of furfuryl mercaptan in the beverage is 1,800 to 5,000 µg/L;
 (vi) a content of furfuryl methyl disulfide in the beverage is 25 to 300 µg/L; and
 (vii) a content of furfuryl thioacetate in the beverage is 25 to 300 µg/L.
(5) The packed coffee beverage according to any one of (1) to (4), where the content of furfuryl methyl sulfide in the beverage is 150 to 500 µg/L.
(6) The packed coffee beverage according to any one of (1) to (5), where the beverage is black coffee.
(7) The packed coffee beverage according to any one of (1) to (6), where a Brix value of the beverage is 0.4 or more.
(8) The packed coffee beverage according to any one of (1) to (7), where the beverage is packed in a re-sealable lidded container.
(9) A production method for a packed coffee beverage, including:
 (i) adjusting a content of guaiacol in a beverage to 10 to 600 µg/L;
 (ii) adjusting a content of furfuryl methyl sulfide in the beverage to 22 to 1,000 µg/L; and
 (iii) packing the beverage.

Advantageous Effects of Invention

According to the present invention, it is possible to provide a coffee beverage having, regardless of a liquid temperature, reduced bitterness and little aftertaste. Further, it is also possible to provide a coffee beverage with high drinkability since the coffee beverage has reduced bitterness and little aftertaste.

DESCRIPTION OF EMBODIMENTS

1. Packed Coffee Beverages

An embodiment of the present invention is a packed coffee beverage having the contents of guaiacol and furfuryl methyl sulfide within specific ranges. Consequently, it is possible to provide a packed coffee beverage having, regardless of a liquid temperature of the beverage, reduced bitterness and little aftertaste. Further, it is also possible to provide a coffee beverage with high drinkability due to reduced bitterness and little aftertaste. Herein, the term "bitterness" refers to lingering bitterness unique to coffee that remains on the tongue and that affects the duration of aftertaste. A coffee beverage with bitterness has lingering aftertaste whereas a coffee beverage with reduced bitterness has little aftertaste. Moreover, the term "drinkability" refers to the quality of discomfort-free smooth-to-drink taste.

1-1. Guaiacol

Guaiacol is a component that contributes to bitterness unique to coffee. Herein, guaiacol is denoted by (a) in some cases.

In the present invention, the guaiacol content in the coffee beverage is 10 to 600 µg/L, 10 to 550 µg/L, 100 to 550 µg/L, preferably 100 to 500 µg/L, 100 to 300 µg/L, and more preferably 150 to 300 µg/L. When the guaiacol content in the coffee beverage is lower than the above-mentioned ranges, bitterness unique to coffee is not perceived at all and the very nature of coffee is absent in some cases. Meanwhile, when the guaiacol content in the coffee beverage is higher than the above-mentioned ranges, bitterness unique to coffee cannot be reduced satisfactorily particularly at ambient temperature in some cases. Here, the guaiacol content can be determined by the GC-MS method.

1-2. Furfuryl Methyl Sulfide

Furfuryl methyl sulfide is commonly known as a component with the dark roasted aroma unique to coffee. In the present invention, however, furfuryl methyl sulfide is a component that specifically exhibits the effect of reducing bitterness of a coffee beverage at ambient temperature (around 20° C.). Herein, furfuryl methyl sulfide is denoted by (p) in some cases.

In the present invention, the furfuryl methyl sulfide content in the coffee beverage is 22 to 1,000 µg/L, 25 to 1,000 µg/L, preferably 25 to 800 µg/L, 50 to 800 µg/L, and more preferably 150 to 500 µg/L. When the furfuryl methyl sulfide content falls beyond the above-mentioned ranges, the effect of reducing bitterness of a coffee beverage at ambient temperature cannot be satisfactorily obtained in some cases. Here, the furfuryl methyl sulfide content can be determined by the GC-MS method.

1-3. p-Ethylphenol, p-Cresol, Phenol, and 2-Acetylpyrrole

In the present invention, all of p-ethylphenol, p-cresol, phenol, and 2-acetylpyrrole are components that contribute to bitterness unique to coffee. Further, in the coffee beverage of the present invention, the contents of one or more components selected from the group consisting of p-ethylphenol, p-cresol, phenol, and 2-acetylpyrrole may be adjusted within specific ranges from a viewpoint of effectively reducing bitterness unique to coffee. Herein, p-ethylphenol, p-cresol, phenol, and 2-acetylpyrrole are denoted by (b), (c), (d), and (e), respectively, in some cases.

The p-ethylphenol content in the coffee beverage of the present invention is not particularly limited, but is preferably 2.0 to 20 μg/L, more preferably 3.0 to 19 μg/L, and further preferably 5.0 to 18 μg/L. In addition, the p-cresol content in the coffee beverage of the present invention is not particularly limited, but is preferably 2.0 to 20 μg/L, more preferably 3.0 to 19 μg/L, and further preferably 5.0 to 18 μg/L. Moreover, the phenol content in the coffee beverage of the present invention is not particularly limited, but is preferably 50 to 1,100 μg/L, more preferably 320 to 1,080 μg/L, and further preferably 370 to 1,050 μg/L. Further, the 2-acetylpyrrole content in the coffee beverage of the present invention is not particularly limited, but is preferably 300 to 1,500 μg/L, more preferably 600 to 1,480 μg/L, and further preferably 800 to 1,450 μg/L. Here, the contents of p-ethylphenol, p-cresol, phenol, and 2-acetylpyrrole can be determined by the GC-MS method.

1-4. Furfuryl Mercaptan, Furfuryl Methyl Disulfide, and Furfuryl Thioacetate

In the present invention, all of furfuryl mercaptan, furfuryl methyl disulfide, and furfuryl thioacetate are commonly known as components with dark roasted aroma unique to coffee. In the present invention, however, these compounds are components that specifically exhibit the effect of reducing bitterness of a coffee beverage at ambient temperature (around 20° C.), in a similar manner to furfuryl methyl sulfide. Further, in the coffee beverage of the present invention, the contents of one or more components selected from the group consisting of furfuryl mercaptan, furfuryl methyl disulfide, and furfuryl thioacetate may be adjusted within specific ranges from a viewpoint of effectively reducing bitterness of a coffee beverage at ambient temperature (around 20° C.).

The furfuryl mercaptan content in the coffee beverage of the present invention is not particularly limited, but is preferably 1,800 to 5,000 μg/L, more preferably 1,850 to 4,000 μg/L, and further preferably 1,900 to 3,500 μg/L. Moreover, the furfuryl methyl disulfide content in the coffee beverage of the present invention is not particularly limited, but is preferably 25 to 300 μg/L, more preferably 30 to 200 μg/L, and further preferably 30 to 100 μg/L. The furfuryl thioacetate content in the coffee beverage of the present invention is not particularly limited, but is preferably 25 to 300 μg/L, more preferably 30 to 200 μg/L, and further preferably 30 to 100 μg/L. Here, the contents of furfuryl mercaptan, furfuryl methyl disulfide, and furfuryl thioacetate can be determined by the GC-MS method.

1-5. Ratios of the Content of Guaiacol, p-Ethylphenol, p-Cresol, Phenol, or 2-Acetylpyrrole and the Content of Furfuryl Methyl Sulfide From a viewpoint of achieving, regardless of a liquid temperature of the beverage, reduced bitterness and little aftertaste, the coffee beverage of the present invention preferably has a ratio of the content of guaiacol (a), p-ethylphenol (b), p-cresol (c), phenol (d), or 2-acetylpyrrole (e) and the content of furfuryl methyl sulfide (p) within a specific range. For example, the content ratio of furfuryl methyl sulfide (p) to guaiacol (a) [(p)/(a)] is preferably 1.5>[(p)/(a)]>0.01 and more preferably 0.8>[(p)/(a)]>0.05. In addition, the content ratio of furfuryl methyl sulfide (p) to p-ethylphenol (b) [(p)/(b)] is preferably 40>[(p)/(b)]>0.5 and more preferably 32>[(p)/(b)]>1.3. Moreover, the content ratio of furfuryl methyl sulfide (p) to p-cresol (c) [(p)/(c)] is preferably 20>[(p)/(c)]>0.5 and more preferably 16>[(p)/(c)]>1.3. Further, the content ratio of furfuryl methyl sulfide (p) to phenol (d) [(p)/(d)] is preferably 1.0>[(p)/(d)]>0.01 and more preferably 0.6>[(p)/(d)]>0.02. Still further, the content ratio of furfuryl methyl sulfide (p) to 2-acetylpyrrole (e) [(p)/(e)] is preferably 0.5>[(p)/(e)]>0.01 and more preferably 0.2>[(p)/(e)]>0.02.

1-6. Coffee Beverages

Herein, a "coffee beverage" refers to a heat-sterilized beverage product using a coffee component as an ingredient. The types of products are not particularly limited, but are primarily "coffee", "coffee beverages", and "coffee-containing soft drinks" as defined in "the Fair Competition Code on Labeling of Coffee Drinks" approved in 1977. Meanwhile, beverages that use a coffee component as an ingredient but contain 3.0% by weight or more of milk solids are subject to "the Fair Competition Code on Labeling of Drinking Milk" and treated as "milk beverages". These beverages are also encompassed in the coffee beverage of the present invention. Here, the coffee component refers to a component that contains a coffee bean-derived component. Examples include a liquid coffee extract, in other words, a solution prepared by extracting roasted and ground coffee beans with water, hot water, or the like. Other examples of the coffee component include solutions of coffee essence or a frozen liquid coffee extract, instant coffee or a dried liquid coffee extract, and the like adjusted to an appropriate volume with water, hot water, or the like.

The cultivated species of coffee beans used for the coffee beverage of the present invention are not particularly limited. Examples include Arabica, Robusta, and Liberica, and Arabica is preferably used. Moreover, the varieties are also not particularly limited, and examples include Mocha, Brazil, Colombia, Guatemala, Blue Mountain, Kona, Mandheling, and Kilimanjaro. One type or a plurality of blended types of coffee beans may be used. Regarding the roasting method of coffee beans, a common method may be employed without particular restrictions on the roasting temperature or the roasting environment. Further, the extraction method from such roasted coffee beans is by no means limited, and examples include a method of extracting coarse, medium, or fine grounds of roasted coffee beans by using water or hot water (0 to 200° C.). Exemplary extraction methods include a drip mode, a siphon mode, a boiling mode, a jet mode, and a continuous mode.

The coffee beverage of the present invention may be added with a milk component, such as milk, cow's milk, or a dairy product, as necessary, but is preferably milk component-free black coffee.

The coffee beverage of the present invention is a packed coffee beverage in which the coffee beverage is packed in any container. Containers in which the coffee beverage of the present invention is packed may be appropriately selected corresponding to sterilization methods and/or storage methods, and any of commonly used containers, such as aluminum cans, steel cans, PET bottles, glass bottles, and paper containers, may be used. Since the coffee beverage of the present invention is suitable for a consumption mode over a long time, re-sealable lidded containers, namely, bottle cans and PET bottles are preferable. Moreover, lightweight containers, specifically PET bottles, are further preferable since these containers are suitable for a mode of carrying easily. The volume of the coffee beverage of the present invention is not particularly limited and is preferably 160 to 600 g. In view of consumption over a long time, the volume is preferably 250 g or more and more preferably 450 g or more. For packing the coffee beverage of the present invention, either of the hot-pack filling method or the aseptic filling method may be employed, and the aseptic filling method is more preferably employed. Here, the hot-pack filling method generally refers to a method of packing a beverage heated to 60° C. or higher in a container, immediately followed by sealing. Meanwhile, the aseptic filling apparatus generally refers to an apparatus for packing, in a sterile container, the content sterilized at a high temperature for a short time and sealing the container in an aseptic environment.

The heat sterilization method for the coffee beverage of the present invention is not particularly limited and may be performed in accordance with local regulations (the Food Sanitation Law in Japan), for example. Specific examples include a method (UHT sterilization method) of sterilizing at a high temperature for a short time, followed by packing in a sterilized storage container under aseptic conditions; and a retort sterilization method of packing a preparation in a storage container, such as a can, followed by retort treatment. The conditions for the UHT sterilization method are typically 120° C. to 150° C. for about 1 to 120 seconds and preferably 130° C. to 145° C. for about 30 to 120 seconds. Meanwhile, the conditions for the retort sterilization method are typically 110° C. to 130° C. for about 10 to 30 minutes and preferably 120° C. to 125° C. for about 10 to 20 minutes.

1-7. Brix Values

The Brix value is a value of the mass of a sucrose solution/percentage by mass converted, on the basis of the conversion table by ICUMSA (the International Commission for Uniform Methods of Sugar Analysis), from a refractive index measured at 20° C. by using a saccharimeter, a refractometer, or the like and represents a soluble solids content in a beverage. The unit is expressed as "Bx", "%", or "degree (°)" in some cases. A low Brix value of a beverage means a low content of soluble solids including saccharides in the beverage.

The Brix value of the coffee beverage of the present invention is not particularly limited, but is preferably 0.4 or more, more preferably 0.4 to 2.5, and further preferably 0.6 to 2.0.

1-8. Other Components

In addition to the above-described components, the coffee beverage of the present invention may appropriately contain, unless the effects of the present invention are impaired, sweeteners (sucrose, high-fructose corn syrup, glucose, fructose, lactose, maltose, xylose, isomerized lactose, fructooligosaccharides, maltooligosaccharides, isomaltooligosaccharides, galactooligosaccharides, coupling sugar, palatinose, maltitol, sorbitol, erythritol, xylitol, lactitol, palatinit, hydrogenated starch hydrolysates, stevia, glycyrrhizin, thaumatin, monellin, aspartame, alitame, saccharin, acesulfame K, sucralose, and dulcin, for example), antioxidants (vitamin C and sodium erythorbate, for example), emulsifiers (sucrose fatty acid esters, sorbitan fatty acid esters, and polyglycerol fatty acid esters, for example), sodium caseinate, flavors (coffee flavors and milk flavors, for example), and the like. The coffee beverage of the present invention particularly preferably contain flavors from a viewpoint of adjusting the concentrations of guaiacol and furfuryl methyl sulfide within specific ranges. Moreover, the beverage of the present invention is preferably a sweetener-free coffee beverage since the effects of the present invention may possibly be impaired by sweeteners.

1-9. pH

The coffee beverage of the present invention preferably has a pH within a predetermined range. Common pH adjusters may be used for adjusting pH. Examples of such pH adjusters include bases, such as sodium hydroxide and potassium hydroxide; sodium or potassium salts of organic acids, such as sodium bicarbonate, sodium carbonate, potassium bicarbonate, potassium carbonate, disodium phosphate, sodium citrate, potassium citrate, sodium acetate, potassium acetate, and sodium L-ascorbate; and other pH adjusters or acidulants usable under the Food Sanitation Act. Moreover, it is also possible to adjust to a predetermined pH by mixing liquid coffee extracts having different pH.

In the invention according to the embodiment, pH is preferably within the range of 4.0 to 7.0, more preferably the range of 4.5 to 6.5, and further preferably the range of 5.5 to 6.5.

2. Production Method for Packed Coffee Beverage and Method of Reducing Bitterness and Aftertaste of Packed Coffee Beverage Regardless of Liquid Temperature In an embodiment, the present invention is a production method for a packed coffee beverage. More specifically, an embodiment of the present invention is a production method for a packed coffee beverage including: (i) adjusting a content of guaiacol in a beverage to 10 to 600 μg/L; (ii) adjusting a content of furfuryl methyl sulfide in the beverage to 22 to 1,000 μg/L; and (iii) packing the beverage.

Further, another embodiment is a method of reducing bitterness and aftertaste of a packed coffee beverage regardless of the liquid temperature, including: (i) adjusting a content of guaiacol in a beverage to 10 to 600 μg/L; (ii) adjusting a content of furfuryl methyl sulfide in the beverage to 22 to 1,000 μg/L; and (iii) packing the beverage.

The above-mentioned methods may further include a step of adding one or more components selected from the group consisting of p-ethylphenol, p-cresol, phenol, 2-acetylpyrrole, furfuryl mercaptan, furfuryl methyl disulfide, and furfuryl thioacetate and adjusting the contents of these components. Moreover, a step of adjusting a ratio of the content of guaiacol, p-ethylphenol, p-cresol, phenol, or 2-acetylpyrrole and the content of furfuryl methyl sulfide may also be included. Further, the above-mentioned methods may also include a step of adding components that can be used in common coffee beverages, a step of adjusting pH, and/or a step of heat sterilization.

In the above-mentioned methods, the foregoing steps may be performed in any order provided that the contents and the like in a finally obtained coffee beverage fall within the required ranges.

Here, coffee beverages as well as the species, producing regions, and so forth of coffee beans as raw materials are as described above. Moreover, the content ranges and content ratio ranges of guaiacol, p-ethylphenol, p-cresol, phenol, 2-acetylpyrrole, furfuryl methyl sulfide, furfuryl mercaptan, furfuryl methyl disulfide, and furfuryl thioacetate; the pH ranges; other components; and the like are also as described above. Further, the measuring methods for various components are also as in the foregoing.

EXAMPLES

Hereinafter, the present invention will be described in further detail with reference to the Examples. The present invention, however, is not limited to these Examples.

1. Production of Sample Coffee Beverages

In the working examples, sample beverages with different contents of guaiacol, p-ethylphenol, p-cresol, phenol, 2-acetylpyrrole, and furfuryl methyl sulfide were prepared. A specific preparation method for each sample beverage will be described hereinafter.

First, medium roasted coffee beans (Guatemalan beans: L value of 20) were ground and extracted with an extraction machine at 50° C. by using, as extraction water, 9 times the mass of hot water relative to the amount of the coffee beans. During the extraction step, a steaming time was set for 3 minutes. Extraction was terminated when the amount of collected extraction water reached approximately 3 times the mass of the coffee beans. The liquid extract was then subjected to centrifugation and membrane filtration. Subsequently, the resulting liquid extract was diluted about 3 times and further added with sodium bicarbonate to yield a base beverage. The contents of guaiacol, p-ethylphenol, p-cresol, phenol, 2-acetylpyrrole, furfuryl methyl sulfide, furfuryl mercaptan, furfuryl methyl disulfide, and furfuryl thioacetate in the base beverage were determined in accordance with the analysis method described hereinafter. Table 1 shows the content of the respective components in the base beverage.

TABLE 1

| Unit: μg/L | Guaiacol (a) | p-Ethylphenol (b) | p-Cresol (c) | Phenol (d) | 2-Acetylpyrrole (e) | Furfuryl methyl sulfide | furfuryl mercaptan | Furfuryl methyl disulfide | Furfuryl thioacetate |
|---|---|---|---|---|---|---|---|---|---|
| Base beverage | 262.7 | 6.3 | 12.6 | 371.7 | 1068.7 | 21.5 | 437.5 | 2.5 | 0.2 |

The coffee beverages of the Examples and the Comparative Examples were obtained by adding, to the base beverage, appropriate amounts of guaiacol, p-ethylphenol, p-cresol, phenol, 2-acetylpyrrole, or furfuryl methyl sulfide and performing UHT sterilization at F0=4 or more, followed by aseptic filling of 500 mL PET bottles. Here, all the beverages (excluding commercial products) in all the test examples have a Brix value within the range of 1.0 to 1.1.

2. Measurement for Contents of Guaiacol, p-Ethylphenol, p-Cresol, Phenol, 2-Acetylpyrrole, Furfuryl Methyl Sulfide, Furfuryl Mercaptan, Furfuryl Methyl Disulfide, and Furfuryl Thioacetate The retort-sterilized packed coffee beverage samples produced in 1 above (Examples and Comparative Examples) were opened, and the contents of guaiacol, p-ethylphenol, p-cresol, phenol, 2-acetylpyrrole, furfuryl methyl sulfide, furfuryl mercaptan, furfuryl methyl disulfide, and furfuryl thioacetate in each coffee beverage were measured by GC-MS under the analysis conditions below. Moreover, the content of each component in commercial canned coffee 1 to 3 (commercial product 1: UCC Black Coffee, commercial product 2: Tully's Coffee, commercial product 3: KIRIN Fire Kobashi (Aromatic) Black Coffee) was also analyzed in the same manner. The results are shown in Tables 2 to 7.

<Analysis Conditions for Guaiacol, p-Ethylphenol, p-Cresol, Phenol, and 2-Acetylpyrrole>

To a 20 mL screw cap vial (diameter of 18 mm, from Gerstel K. K.), 5 mL of a liquid sample was fed, and the vial was sealed with a metal cap having a PTFE septum (from Gerstel K. K.). Aroma components were extracted by solid-phase microextraction (SPME) and quantified by the standard addition method using peak areas detected by GC/MS (EIC mode). The apparatus used and conditions are as follows.

SPME fiber: StableFlex/SS, 50/30 μm DVB/CAR/PDMS (from Supelco Analytical)
Fully automatic volatile component extraction/introduction apparatus: MultiPurpose Sampler MPS2XL (from Gerstel K. K.)
Preheating: 40° C. for 5 minutes
Stirring: none
Volatile component extraction: 40° C. for 30 minutes
Volatile component desorption time: 3 minutes
GC oven: GC 7890A (from Agilent Technologies, Inc.)
Column: VF-WAXms, 60 m×0.25 mm i.d. df=0.50 μm (from Agilent Technologies, Inc.)
GC temperature conditions: 40° C. (5 minutes)→5° C./min→260° C. (11 minutes)
Carrier gas: helium, 1.2 mL/min, constant flow rate mode
Injection: spritless mode
Inlet temperature: 250° C.
Mass spectrometer: GC/MS Triple Quad 7000 (from Agilent Technologies, Inc.)
Ionization mode: EI (70 eV)
Measurement mode: measurement in scan mode or simultaneous measurement in scan/SIM mode
Scan parameter: m/z of 35 to 350

Target ions may be selected from ions that exhibit good detection sensitivity, peak shape, and peak separation among the following ions: m/z of 109, 124, or 81 (81 in the working examples) for guaiacol; m/z of 107, 122, or 77 (107 in the working examples) for p-ethylphenol; m/z of 107, 108, 77, or 79 (107 in the working examples) for p-cresol; m/z of 94, 66, or 65 (94 in the working examples) for phenol; and m/z of 94, 109, or 66 (94 in the working examples) for 2-acetylpyrrole.

When none of the above-mentioned ions are satisfactory in peak shape or sensitivity, a liquid sample may be diluted appropriate times with distilled water or the SIM mode may be employed.

<Analysis Conditions for Furfuryl Methyl Sulfide, Furfuryl Mercaptan, Furfuryl Methyl Disulfide, and Furfuryl Thioacetate>

A 5 mL of a liquid sample was fed to a 20 mL screw cap vial (diameter of 18 mm, from Gerstel K. K.), and the vial was sealed with a metal cap having a PTFE septum (from Gerstel K. K.). Aroma components were extracted by solid-phase microextraction (SPME) and quantified by the standard addition method using peak areas detected by GC/MS (EIC mode). The apparatus used and conditions are as follows.

SPME fiber: StableFlex/SS, 50/30 μm DVB/CAR/PDMS (from Supelco Analytical)
Fully automatic volatile component extraction/introduction apparatus: MultiPurpose Sampler MPS2XL (from Gerstel K. K.)
Preheating: 40° C. for 5 minutes
Stirring: none
Volatile component extraction: 40° C. for 30 minutes
Volatile component desorption time: 3 minutes
GC oven: GC 7890A (from Agilent Technologies, Inc.)
Column: VF-WAX-ms, 60 m×0.25 mm i.d. df=0.50 μm (from Agilent Technologies, Inc.)

GC temperature conditions: 40° C. (5 minutes)→5° C./min→260° C. (11 minutes)

Carrier gas: helium, 1.2 mL/min, constant flow rate mode

Injection: spritless mode

Inlet temperature: 250° C.

Mass spectrometer: GC/MS Triple Quad 7000 (from Agilent Technologies, Inc.)

Ionization mode: EI (70 eV)

Measurement mode: measurement in scan mode or simultaneous measurement in scan/SIM mode Scan parameter: m/z of 35 to 350

Target ions may be selected from ions that exhibit good detection sensitivity, peak shape, and peak separation among the following ions: m/z of 81, 128, 53, 45, 82, 129, or 130 (129 in the working examples) for furfuryl methyl sulfide; m/z of 81, 160, 53, or 82 (82 in the working examples) for furfuryl methyl disulfide; and m/z of 81, 156, 113, 53, 82, 114, or 115 (113 in the working examples) for furfuryl thioacetate. When none of the above-mentioned ions are satisfactory in peak shape or sensitivity, a liquid sample may be diluted appropriate times with distilled water or the SIM mode may be employed.

Furfuryl mercaptan was measured by changing to the following conditions. Measurement mode: measurement by MRM, Precursor ion: m/z of 114, Product ion: m/z of 81, Collision energy: 10, and Dwell: 200 ms. When the peak shape is unsatisfactory, a liquid sample may be diluted appropriate times with distilled water.

3. Sensory Evaluation

The retort sterilized packed coffee beverage samples (Examples and Comparative Examples) prepared in 1 above and commercial products 1 to 3 were stored at ambient temperature (20° C.) and at a high temperature (60° C.) such that the liquid temperature reaches each temperature. Each coffee beverage after opening was subjected to sensory evaluation by three trained expert panelists and evaluated for bitterness and the duration of aftertaste of the coffee beverage. Specifically, the beverages were scored in increments of 0.1 point by each expert panelist in accordance with the criteria below, and the average scores are shown in Tables 2 to 7 and Table 9. The sensory evaluation for both samples at ambient temperature and at a high temperature is performed on the basis of the sensory evaluation result (sensory evaluation score: 3.0) for commercial product 1 at a high temperature (control). A coffee beverage with an average score exceeding 3 is determined as a desirable coffee beverage having reduced bitterness regardless of the liquid temperature.

Moreover, drinkability of drinking 500 mL was also evaluated. Each coffee beverage was evaluated for drinkability by three trained expert panelists. Specifically, the beverages were scored in increments of 0.1 point by each expert panelist in accordance with the criteria below, and the average scores are shown in Table 9. The sensory evaluation was performed on the basis of the sensory evaluation result (sensory evaluation score: 2.0) for commercial product 1 (control) during consumption of one bottle. A coffee beverage with an average score exceeding 3 is determined as a coffee beverage with desirable drinkability.

<Criteria for Evaluation Score>Bitterness and Duration of Aftertaste 5.0: considerably reduced bitterness and extremely little aftertaste compared with the control 4.0: reduced bitterness and little aftertaste compared with the control 3.0: bitterness and the duration of aftertaste comparable to the control 2.0: bitterness and lingering aftertaste compared with the control 1.0: intense bitterness and extremely lingering aftertaste compared with the control <Criteria for Evaluation Score>Drinkability 5.0: extremely smooth to drink compared with the control and possible to finish drinking 500 mL easily 4.0: smooth to drink compared with the control and possible to finish drinking 500 mL 3.0: smooth to drink compared with the control, but barely possible to finish drinking 500 mL 2.0: smooth to drink comparable to the control, but difficult to finish drinking 500 mL 1.0: extremely harsh to drink compared with the control and difficult to finish drinking 500 mL 4. Results (1) Test Example 1

In test example 1, the impact of the furfuryl methyl sulfide content relative to the guaiacol content on bitterness at ambient temperature and at a high temperature was evaluated. As shown in Table 2, it was revealed that the coffee beverages (Examples 1-1 to 1-12) in which the contents of guaiacol and furfuryl methyl sulfide fall within the predetermined ranges of the present invention have a sensory evaluation score exceeding 3 both at ambient temperature and at a high temperature and thus have reduced bitterness and little aftertaste regardless of the liquid temperature of the beverages.

Further, Examples 1-1 to 1-4 reveal that as a ratio of the furfuryl methyl sulfide content to the guaiacol content (furfuryl methyl sulfide content/guaiacol content) increases, further effects tend to be obtained.

As shown in Table 3, it is revealed that all commercial products 1 to 3, in which the guaiacol content falls beyond the range of the present invention, have a sensory evaluation score less than 3 at ambient temperature and thus have intense bitterness and lingering aftertaste at ambient temperature. In addition, drinkability of commercial products 2 and 3 was the same as 2.0 of commercial product 1.

TABLE 2

| Unit: µg/L | Guaiacol (a) | p-Ethylphenol (b) | p-Cresol (c) | Phenol (d) | 2-Acetylpyrrole (e) | Furfuryl methyl sulfide (p) | (p)/(a) | Sensory evaluation score | |
|---|---|---|---|---|---|---|---|---|---|
| | | | | | | | | Ambient temperature | High temperature |
| Ex. 1-1 | 262.7 | 6.3 | 12.6 | 372 | 1,069 | 25 | 0.10 | 3.8 | 3.8 |
| Ex. 1-2 | 550 | 6.3 | 12.6 | 372 | 1,069 | 25 | 0.05 | 3.7 | 3.9 |
| Ex. 1-3 | 262.7 | 6.3 | 12.6 | 372 | 1,069 | 200 | 0.76 | 4.0 | 4.0 |
| Ex. 1-4 | 550 | 6.3 | 12.6 | 372 | 1,069 | 200 | 0.36 | 4.0 | 4.0 |

TABLE 2-continued

| Unit: μg/L | Guaiacol (a) | p-Ethylphenol (b) | p-Cresol (c) | Phenol (d) | 2-Acetylpyrrole (e) | Furfuryl methyl sulfide (p) | (p)/(a) | Sensory evaluation score Ambient temperature | High temperature |
|---|---|---|---|---|---|---|---|---|---|
| Comp. Ex. 1-1 | 550 | 6.3 | 12.6 | 372 | 1,069 | 22 | 0.04 | 2.8 | 2.8 |
| Comp. Ex. 1-2 | 650 | 6.3 | 12.6 | 372 | 1,069 | 25 | 0.04 | 2.5 | 3.7 |
| Comp. Ex. 1-3 | 650 | 6.3 | 12.6 | 372 | 1,069 | 200 | 0.31 | 2.7 | 3.9 |
| Ex. 1-5 | 262.7 | 25 | 25 | 1,200 | 1,600 | 25 | 0.10 | 3.2 | 3.3 |
| Ex. 1-6 | 262.7 | 25 | 25 | 1,200 | 1,600 | 200 | 0.76 | 3.3 | 3.5 |
| Ex. 1-7 | 262.7 | 25 | 25 | 1,200 | 1,600 | 400 | 1.52 | 3.4 | 3.4 |
| Ex. 1-8 | 262.7 | 25 | 25 | 1,200 | 1,600 | 800 | 3.05 | 3.3 | 3.2 |
| Comp. Ex. 1-4 | 262.7 | 25 | 25 | 1,200 | 1,600 | 1,100 | 4.19 | 2.8 | 3.1 |
| Ex. 1-9 | 400 | 25 | 25 | 1,200 | 1,600 | 200 | 0.50 | 3.2 | 3.3 |
| Ex. 1-10 | 550 | 25 | 25 | 1,200 | 1,600 | 200 | 0.36 | 3.2 | 3.2 |
| Ex. 1-11 | 400 | 25 | 25 | 1,200 | 1,600 | 25 | 0.06 | 3.2 | 3.1 |
| Ex. 1-12 | 550 | 25 | 25 | 1,200 | 1,600 | 25 | 0.05 | 3.1 | 3.1 |

TABLE 3

| Unit: μg/L | Guaiacol (a) | p-Ethylphenol (b) | p-Cresol (c) | Phenol (d) | 2-Acetylpyrrole (e) | Furfuryl methyl sulfide (p) | Furfuryl mercaptan | Furfuryl methyl disulfide | Furfuryl thioacetate |
|---|---|---|---|---|---|---|---|---|---|
| Commercial product 1 | 932.3 | 15.5 | 15.8 | 1,161.8 | 1,831.2 | 36.9 | 208.0 | 6.4 | 0.9 |
| Commercial product 2 | 1,018.7 | 28 | 23.4 | 1,352.1 | 2,197.7 | 45.7 | 789.8 | 21 | 8 |
| Commercial product 3 | 626 | 26.5 | 23.9 | 1,194.4 | 1,676.7 | 118 | 1,433.3 | 92.3 | 2.2 |

| Unit: μg/L | Sensory evaluation score Ambient temperature | High temperature | Drinkability |
|---|---|---|---|
| Commercial product 1 | 2.6 | 3.0 | 2.0 |
| Commercial product 2 | 2.4 | 3.6 | 2.0 |
| Commercial product 3 | 2.8 | 3.5 | 2.0 |

(2) Test Example 2

In test example 2, the impact of the furfuryl methyl sulfide content relative to the p-ethylphenol content on bitterness at ambient temperature and at a high temperature was evaluated. As shown in Table 4, it is revealed that the coffee beverages (Examples 1-1 and 2-2 to 2-7) in which the contents of p-ethylphenol and furfuryl methyl sulfide fall within the predetermined ranges of the present invention have a sensory evaluation score exceeding 3 both at ambient temperature and at a high temperature and thus have reduced bitterness and little aftertaste regardless of the liquid temperature of the beverages.

Further, it is also revealed that as a ratio of the furfuryl methyl sulfide content to the p-ethylphenol content (furfuryl methyl sulfide content/p-ethylphenol content) increases, further effects tend to be obtained.

TABLE 4

| Unit: μg/L | Guaiacol (a) | p-Ethylphenol (b) | p-Cresol (c) | Phenol (d) | 2-Acetylpyrrole (e) | Furfuryl methyl sulfide (p) | (p)/(b) | Sensory evaluation score Ambient temperature | High temperature |
|---|---|---|---|---|---|---|---|---|---|
| Ex. 1-1 | 262.7 | 6.3 | 12.6 | 372 | 1,069 | 25 | 3.95 | 3.8 | 3.8 |
| Ex. 2-2 | 262.7 | 18 | 12.6 | 372 | 1,069 | 25 | 1.39 | 3.7 | 3.9 |
| Ex. 2-3 | 262.7 | 6.3 | 12.6 | 372 | 1,069 | 200 | 31.63 | 4.0 | 4.0 |
| Ex. 2-4 | 262.7 | 18 | 12.6 | 372 | 1,069 | 200 | 11.11 | 4.0 | 4.0 |

TABLE 4-continued

| Unit: μg/L | Guaiacol (a) | p-Ethylphenol (b) | p-Cresol (c) | Phenol (d) | 2-Acetylpyrrole (e) | Furfuryl methyl sulfide (p) | (p)/(b) | Sensory evaluation score Ambient temperature | High temperature |
|---|---|---|---|---|---|---|---|---|---|
| Com. Ex. 2-1 | 262.7 | 18 | 12.6 | 372 | 1,069 | 21.5 | 1.20 | 2.8 | 2.8 |
| Ex. 2-5 | 262.7 | 20 | 25 | 1,200 | 1,600 | 200 | 10.0 | 3.6 | 3.7 |
| Ex. 2-6 | 262.7 | 19 | 25 | 1,200 | 1,600 | 200 | 10.53 | 3.7 | 3.7 |
| Ex. 2-7 | 262.7 | 15 | 25 | 1,200 | 1,600 | 200 | 13.33 | 3.8 | 3.8 |

(3) Test Example 3

In test example 3, the impact of the furfuryl methyl sulfide content relative to the p-cresol content on bitterness at ambient temperature and at a high temperature was evaluated. As shown in Table 5, it is revealed that the coffee beverages (Examples 1-1 and 3-2 to 3-7) in which the contents of p-cresol and furfuryl methyl sulfide fall within the predetermined ranges of the present invention have a sensory evaluation score exceeding 3 both at ambient temperature and at a high temperature and thus have reduced bitterness and little aftertaste regardless of the liquid temperature of the beverages.

Further, it is also revealed that as a ratio of the furfuryl methyl sulfide content to the p-cresol content (furfuryl methyl sulfide content/p-cresol content) increases, further effects tend to be obtained.

TABLE 5

| Unit: μg/L | Guaiacol (a) | p-Ethylphenol (b) | p-Cresol (c) | Phenol (d) | 2-Acetylpyrrole (e) | Furfuryl methyl sulfide (p) | (p)/(c) | Sensory evaluation score Ambient temperature | High temperature |
|---|---|---|---|---|---|---|---|---|---|
| Ex. 1-1 | 262.7 | 6.3 | 12.6 | 371.7 | 1,068.7 | 25 | 1.99 | 3.8 | 3.8 |
| Ex. 3-2 | 262.7 | 6.3 | 18 | 371.7 | 1,068.7 | 25 | 1.39 | 3.7 | 3.9 |
| Ex. 3-3 | 262.7 | 6.3 | 12.6 | 371.7 | 1,068.7 | 200 | 15.91 | 4.0 | 4.0 |
| Ex. 3-4 | 262.7 | 6.3 | 18 | 371.7 | 1,068.7 | 200 | 11.11 | 4.0 | 4.0 |
| Com. Ex. 3-1 | 262.7 | 6.3 | 18 | 371.7 | 1,068.7 | 21.5 | 1.20 | 2.8 | 2.8 |
| Ex. 3-5 | 262.7 | 25 | 20 | 1,200.0 | 1,600.0 | 200 | 10.00 | 3.6 | 3.7 |
| Ex. 3-6 | 262.7 | 25 | 19 | 1,200.0 | 1,600.0 | 200 | 10.53 | 3.7 | 3.7 |
| Ex. 3-7 | 262.7 | 25 | 15 | 1,200.0 | 1,600.0 | 200 | 13.33 | 3.8 | 3.8 |

(4) Test Example 4

In test example 4, the impact of the furfuryl methyl sulfide content relative to the phenol content on bitterness at ambient temperature and at a high temperature was evaluated. As shown in Table 6, it is revealed that the coffee beverages (Examples 1-1 and 4-2 to 4-8) in which the contents of phenol and furfuryl methyl sulfide fall within the predetermined ranges of the present invention have a sensory evaluation score exceeding 3 both at ambient temperature and at a high temperature and thus have reduced bitterness and little aftertaste regardless of the liquid temperature of the beverages.

Further, Example 1-1 and Examples 4-2 to 4-4 also reveal that as a ratio of the furfuryl methyl sulfide content to the phenol content (furfuryl methyl sulfide content/phenol content) increases, further effects tend to be obtained.

TABLE 6

| Unit: μg/L | Guaiacol (a) | p-Ethylphenol (b) | p-Cresol (c) | Phenol (d) | 2-Acetylpyrrole (e) | Furfuryl methyl sulfide (p) | (p)/(d) | Sensory evaluation score Ambient temperature | High temperature |
|---|---|---|---|---|---|---|---|---|---|
| Ex. 1-1 | 262.7 | 6.3 | 12.6 | 371.7 | 1,068.7 | 25 | 0.07 | 3.8 | 3.8 |
| Ex. 4-2 | 262.7 | 6.3 | 12.6 | 1,050.0 | 1,068.7 | 25 | 0.02 | 3.7 | 3.9 |
| Ex. 4-3 | 262.7 | 6.3 | 12.6 | 371.7 | 1,068.7 | 200 | 0.54 | 4.0 | 4.0 |
| Ex. 4-4 | 262.7 | 6.3 | 12.6 | 1,050.0 | 1,068.7 | 200 | 0.19 | 4.0 | 4.0 |

TABLE 6-continued

| Unit: μg/L | Guaiacol (a) | p-Ethylphenol (b) | p-Cresol (c) | Phenol (d) | 2-Acetylpyrrole (e) | Furfuryl methyl sulfide (p) | (p)/(d) | Sensory evaluation score Ambient temperature | High temperature |
|---|---|---|---|---|---|---|---|---|---|
| Com. Ex. 4-1 | 262.7 | 6.3 | 12.6 | 1,050.0 | 1,068.7 | 21.5 | 0.02 | 2.8 | 2.8 |
| Ex. 4-5 | 262.7 | 25 | 25 | 1,100.0 | 1,600.0 | 200 | 0.18 | 3.6 | 3.7 |
| Ex. 4-6 | 262.7 | 25 | 25 | 1,070.0 | 1,600.0 | 200 | 0.19 | 3.7 | 3.7 |
| Ex. 4-7 | 262.7 | 25 | 25 | 1,000.0 | 1,600.0 | 200 | 0.20 | 3.8 | 3.8 |
| Ex. 4-8 | 262.7 | 25 | 25 | 371.7 | 1,600.0 | 200 | 0.54 | 3.8 | 3.8 |

(5) Test Example 5

In test example 5, the impact of the furfuryl methyl sulfide content relative to the 2-acetylpyrrole content on bitterness at ambient temperature and at a high temperature was evaluated. As shown in Table 7, it is revealed that the coffee beverages (Examples 1-1 and 5-2 to 5-8) in which the contents of 2-acetylpyrrole and furfuryl methyl sulfide fall within the predetermined ranges of the present invention have a sensory evaluation score exceeding 3 both at ambient temperature and at a high temperature and thus have reduced bitterness and little aftertaste regardless of the liquid temperature of the beverages.

Further, Example 1-1 and Examples 5-2 to 5-4 also reveal that as a ratio of the furfuryl methyl sulfide content to the 2-acetylpyrrole content (furfuryl methyl sulfide content/2-acetylpyrrole content) increases, further effects tend to be obtained.

TABLE 7

| Unit: μm/L | Guaiacol (a) | p-Ethylphenol (b) | p-Cresol (c) | Phenol (d) | 2-Acetylpyrrole (e) | Furfuryl methyl sulfide (p) | (p)/(e) | Sensory evaluation score Ambient temperature | High temperature |
|---|---|---|---|---|---|---|---|---|---|
| Ex. 1-1 | 262.7 | 6.3 | 12.6 | 371.7 | 1068.7 | 25 | 0.02 | 3.8 | 3.8 |
| Ex. 5-2 | 262.7 | 6.3 | 12.6 | 371.7 | 1450 | 25 | 0.02 | 3.7 | 3.9 |
| Ex. 5-3 | 262.7 | 6.3 | 12.6 | 371.7 | 1068.7 | 200 | 0.19 | 4.0 | 4.0 |
| Ex. 5-4 | 262.7 | 6.3 | 12.6 | 371.7 | 1450 | 200 | 0.14 | 4.0 | 4.0 |
| Com. Ex. 5-1 | 262.7 | 6.3 | 12.6 | 371.7 | 1450 | 21.5 | 0.01 | 2.8 | 2.8 |
| Ex. 5-5 | 262.7 | 25 | 25 | 1200 | 1500 | 200 | 0.13 | 3.6 | 3.7 |
| Ex. 5-6 | 262.7 | 25 | 25 | 1200 | 1480 | 200 | 0.14 | 3.7 | 3.7 |
| Ex. 5-7 | 262.7 | 25 | 25 | 1200 | 1450 | 200 | 0.14 | 3.8 | 3.8 |
| Ex. 5-8 | 262.7 | 25 | 25 | 1200 | 1068.7 | 200 | 0.19 | 3.8 | 3.8 |

(6) Test Example 6

In test example 6, the impact of the contents of furfuryl mercaptan, furfuryl methyl disulfide, and furfuryl thioacetate on bitterness at ambient temperature and at a high temperature was evaluated. As shown in Table 8, it is revealed that the coffee beverages (Examples 8-1 to 8-20) in which the contents of 2-acetylpyrrole and furfuryl methyl sulfide fall within the predetermined ranges of the present invention have a sensory evaluation score exceeding 3 both at ambient temperature and at a high temperature and thus have reduced bitterness and little aftertaste regardless of the liquid temperature of the beverages.

TABLE 8

| Unit: μg/L | Guaiacol (a) | p-Ethylphenol (b) | p-Cresol (c) | Phenol (d) | 2-Acetylpyrrole (e) | Furfuryl methyl sulfide (p) | Furfuryl mercaptan | Furfuryl methyl disulfide | Furfuryl thioacetate |
|---|---|---|---|---|---|---|---|---|---|
| EX. 8-1 | 262.7 | 25 | 25 | 1200 | 1600 | 200 | 1800 | 2.5 | 0.2 |
| Ex. 8-2 | 262.7 | 25 | 25 | 1200 | 1600 | 200 | 1850 | 2.5 | 0.2 |
| Ex. 8-3 | 262.7 | 25 | 25 | 1200 | 1600 | 200 | 1900 | 2.5 | 0.2 |
| Ex. 8-4 | 262.7 | 25 | 25 | 1200 | 1600 | 200 | 3000 | 2.5 | 0.2 |
| Ex. 8-5 | 262.7 | 25 | 25 | 1200 | 1600 | 200 | 4000 | 2.5 | 0.2 |

TABLE 8-continued

| | | | | | | | | | |
|---|---|---|---|---|---|---|---|---|---|
| Ex. 8-6 | 262.7 | 25 | 25 | 1200 | 1600 | 200 | 5000 | 2.5 | 0.2 |
| Ex. 8-7 | 262.7 | 25 | 25 | 1200 | 1600 | 200 | 6000 | 2.5 | 0.2 |
| Ex. 8-8 | 262.7 | 25 | 25 | 1200 | 1600 | 200 | 437.5 | 25 | 0.2 |
| Ex. 8-9 | 262.7 | 25 | 25 | 1200 | 1600 | 200 | 437.5 | 30 | 0.2 |
| Ex. 8-10 | 262.7 | 25 | 25 | 1200 | 1600 | 200 | 437.5 | 100 | 0.2 |
| Ex. 8-11 | 262.7 | 25 | 25 | 1200 | 1600 | 200 | 437.5 | 200 | 0.2 |
| Ex. 8-12 | 262.7 | 25 | 25 | 1200 | 1600 | 200 | 437.5 | 300 | 0.2 |
| Ex. 8-13 | 262.7 | 25 | 25 | 1200 | 1600 | 200 | 437.5 | 500 | 0.2 |
| Ex. 8-14 | 262.7 | 25 | 25 | 1200 | 1600 | 200 | 437.5 | 2.5 | 25 |
| Ex. 8-15 | 262.7 | 25 | 25 | 1200 | 1600 | 200 | 437.5 | 2.5 | 30 |
| Ex. 8-16 | 262.7 | 25 | 25 | 1200 | 1600 | 200 | 437.5 | 2.5 | 100 |
| Ex. 8-17 | 262.7 | 25 | 25 | 1200 | 1600 | 200 | 437.5 | 2.5 | 200 |
| Ex. 8-18 | 262.7 | 25 | 25 | 1200 | 1600 | 200 | 437.5 | 2.5 | 300 |
| Ex. 8-19 | 262.7 | 25 | 25 | 1200 | 1600 | 200 | 1900 | 30 | 30 |
| Ex. 8-20 | 262.7 | 15 | 15 | 1000 | 1450 | 200 | 1900 | 30 | 30 |

| | Sensory evaluation | |
|---|---|---|
| | Ambient temperature | High temperature |
| EX. 8-1 | 3.5 | 3.6 |
| Ex. 8-2 | 3.6 | 3.6 |
| Ex. 8-3 | 3.7 | 3.7 |
| Ex. 8-4 | 3.7 | 3.8 |
| Ex. 8-5 | 3.6 | 3.6 |
| Ex. 8-6 | 3.5 | 3.6 |
| Ex. 8-7 | 3.3 | 3.5 |
| Ex. 8-8 | 3.5 | 3.6 |
| Ex. 8-9 | 3.7 | 3.7 |
| Ex. 8-10 | 3.7 | 3.8 |
| Ex. 8-11 | 3.6 | 3.6 |
| Ex. 8-12 | 3.5 | 3.6 |
| Ex. 8-13 | 3.3 | 3.5 |
| Ex. 8-14 | 3.5 | 3.6 |
| Ex. 8-15 | 3.7 | 3.7 |
| Ex. 8-16 | 3.7 | 3.8 |
| Ex. 8-17 | 3.6 | 3.6 |
| Ex. 8-18 | 3.5 | 3.6 |
| Ex. 8-19 | 4.2 | 4.4 |
| Ex. 8-20 | 5 | 5 |

(7) Test Example 7

In test example 7, bitterness, the duration of aftertaste, and drinkability were evaluated. As shown in Table 9, the coffee beverages (Examples 9-1 to 9-40) in which the contents of guaiacol, furfuryl methyl sulfide, p-ethylphenol, and so forth fall within the predetermined ranges of the present invention have a sensory evaluation score exceeding 4 not only for bitterness and the duration of aftertaste at ambient temperature and at a high temperature, but also for drinkability. Accordingly, these coffee beverages are reveled to have reduced bitterness and little aftertaste regardless of the liquid temperature of the beverages as well as a discomfort-free smooth taste that makes possible to finish drinking even 500 mL of a beverage.

TABLE 9

| | | | | | | | | | | Sensory evaluation score | | |
|---|---|---|---|---|---|---|---|---|---|---|---|---|
| | | | | | | | | | | Ambient temperature | | High temperature |
| Unit: μg/L | Guaiacol (a) | p-Ethyl-phenol (b) | p-Cresol (c) | Phenol (d) | 2-Acetyl-pyrrole (e) | Furfuryl methyl sulfide (p) | Furfuryl mercaptan | Furfuryl methyl disulfide | Furfuryl thioacetate | Bitterness•Aftertaste | Drink-ability | Bitterness•Aftertaste |
| EX. 9-1 | 262.7 | 6.3 | 25 | 1200 | 1600 | 25 | 2000 | 30 | 0.2 | 4.0 | 4.1 | 4.1 |
| Ex. 9-2 | 262.7 | 6.3 | 25 | 1200 | 1600 | 25 | 437.5 | 30 | 0.2 | 4.0 | 4.1 | 4.1 |
| Ex. 9-3 | 262.7 | 6.3 | 25 | 1200 | 1600 | 25 | 437.5 | 30 | 30 | 4.0 | 4.1 | 4.1 |
| Ex. 9-4 | 262.7 | 6.3 | 25 | 1200 | 1600 | 200 | 2000 | 30 | 0.2 | 4.2 | 4.2 | 4.3 |
| Ex. 9-5 | 262.7 | 6.3 | 25 | 1200 | 1600 | 200 | 437.5 | 30 | 0.2 | 4.0 | 4.1 | 4.1 |
| Ex. 9-6 | 262.7 | 6.3 | 25 | 1200 | 1600 | 200 | 437.5 | 30 | 30 | 4.1 | 4.2 | 4.2 |
| Ex. 9-7 | 262.7 | 6.3 | 12.6 | 1200 | 1600 | 25 | 2000 | 30 | 0.2 | 4.3 | 4.4 | 4.4 |
| Ex. 9-8 | 262.7 | 6.3 | 12.6 | 1200 | 1600 | 25 | 437.5 | 30 | 0.2 | 4.3 | 4.4 | 4.4 |
| Ex. 9-9 | 262.7 | 6.3 | 12.6 | 1200 | 1600 | 25 | 437.5 | 30 | 30 | 4.3 | 4.3 | 4.4 |
| Ex. 9-10 | 262.7 | 6.3 | 12.6 | 371.7 | 1600 | 25 | 2000 | 30 | 0.2 | 4.4 | 4.5 | 4.5 |
| Ex. 9-11 | 262.7 | 6.3 | 12.6 | 371.7 | 1600 | 25 | 437.5 | 30 | 0.2 | 4.3 | 4.4 | 4.4 |
| Ex. 9-12 | 262.7 | 6.3 | 12.6 | 371.7 | 1600 | 25 | 437.5 | 30 | 30 | 4.4 | 4.5 | 4.5 |
| Ex. 9-13 | 262.7 | 6.3 | 12.6 | 371.7 | 1068.7 | 25 | 2000 | 30 | 0.2 | 4.5 | 4.6 | 4.6 |
| Ex. 9-14 | 262.7 | 6.3 | 12.6 | 371.7 | 1068.7 | 25 | 437.5 | 30 | 0.2 | 4.4 | 4.5 | 4.5 |
| Ex. 9-15 | 262.7 | 6.3 | 12.6 | 371.7 | 1068.7 | 25 | 437.5 | 30 | 30 | 4.5 | 4.6 | 4.6 |

TABLE 9-continued

| Unit: µg/L | Guaiacol (a) | p-Ethyl-phenol (b) | p-Cresol (c) | Phenol (d) | 2-Acetyl-pyrrole (e) | Furfuryl methyl sulfide (p) | Furfuryl mercaptan | Furfuryl methyl disulfide | Furfuryl thioacetate | Ambient temperature Bitterness•Aftertaste | Ambient temperature Drink-ability | High temperature Bitterness•Aftertaste |
|---|---|---|---|---|---|---|---|---|---|---|---|---|
| Ex. 9-16 | 262.7 | 6.3 | 25 | 1200 | 1600 | 25 | 3000 | 30 | 0.2 | 4.0 | 4.1 | 4.1 |
| Ex. 9-17 | 262.7 | 6.3 | 25 | 1200 | 1600 | 25 | 437.5 | 30 | 0.2 | 4.0 | 4.1 | 4.1 |
| Ex. 9-18 | 262.7 | 6.3 | 25 | 1200 | 1600 | 25 | 437.5 | 30 | 100 | 4.0 | 4.1 | 4.1 |
| Ex. 9-19 | 262.7 | 6.3 | 25 | 1200 | 1600 | 200 | 3000 | 30 | 0.2 | 4.2 | 4.3 | 4.3 |
| Ex. 9-20 | 262.7 | 6.3 | 25 | 1200 | 1600 | 200 | 437.5 | 30 | 0.2 | 4.0 | 4.1 | 4.1 |
| EX. 9-21 | 262.7 | 6.3 | 25 | 1200 | 1600 | 200 | 437.5 | 30 | 100 | 4.3 | 4.4 | 4.4 |
| EX. 9-22 | 262.7 | 6.3 | 12.6 | 1200 | 1600 | 25 | 3000 | 30 | 0.2 | 4.3 | 4.4 | 4.4 |
| EX. 9-23 | 262.7 | 6.3 | 12.6 | 1200 | 1600 | 25 | 437.5 | 30 | 0.2 | 4.3 | 4.4 | 4.4 |
| EX. 9-24 | 262.7 | 6.3 | 12.6 | 1200 | 1600 | 25 | 437.5 | 30 | 100 | 4.3 | 4.4 | 4.4 |
| EX. 9-25 | 262.7 | 6.3 | 12.6 | 371.7 | 1600 | 25 | 3000 | 30 | 0.2 | 4.4 | 4.5 | 4.5 |
| EX. 9-26 | 262.7 | 6.3 | 12.6 | 371.7 | 1600 | 25 | 437.5 | 30 | 0.2 | 4.4 | 4.5 | 4.5 |
| EX. 9-27 | 262.7 | 6.3 | 12.6 | 371.7 | 1600 | 25 | 437.5 | 30 | 100 | 4.4 | 4.5 | 4.5 |
| EX. 9-28 | 262.7 | 6.3 | 12.6 | 371.7 | 1068.7 | 25 | 3000 | 30 | 0.2 | 4.5 | 4.6 | 4.6 |
| EX. 9-29 | 262.7 | 6.3 | 12.6 | 371.7 | 1068.7 | 25 | 437.5 | 30 | 0.2 | 4.4 | 4.5 | 4.5 |
| EX. 9-30 | 262.7 | 6.3 | 12.6 | 371.7 | 1068.7 | 25 | 437.5 | 30 | 100 | 4.5 | 4.6 | 4.6 |
| EX. 9-31 | 262.7 | 6.3 | 12.6 | 371.7 | 1068.7 | 25 | 2000 | 30 | 30 | 4.6 | 4.7 | 4.7 |
| EX. 9-32 | 262.7 | 6.3 | 12.6 | 371.7 | 1068.7 | 25 | 2000 | 30 | 100 | 4.7 | 4.7 | 4.7 |
| EX. 9-33 | 262.7 | 6.3 | 12.6 | 371.7 | 1068.7 | 25 | 3000 | 30 | 100 | 4.7 | 4.7 | 4.7 |
| EX. 9-34 | 262.7 | 6.3 | 12.6 | 371.7 | 1068.7 | 25 | 3000 | 30 | 30 | 4.6 | 4.7 | 4.7 |
| EX. 9-35 | 150.0 | 6.3 | 12.6 | 371.7 | 1068.7 | 25 | 2000 | 30 | 100 | 4.6 | 4.7 | 4.7 |
| EX. 9-36 | 150.0 | 6.3 | 12.6 | 371.7 | 1068.7 | 25 | 2000 | 30 | 100 | 4.6 | 4.7 | 4.7 |
| EX. 9-37 | 500.0 | 15 | 25 | 1200 | 1600 | 25 | 2000 | 30 | 100 | 4.2 | 4.2 | 4.3 |
| EX. 9-38 | 500.0 | 15 | 12.6 | 371.7 | 1068.7 | 25 | 2000 | 30 | 30 | 4.9 | 4.9 | 5.0 |
| EX. 9-39 | 262.7 | 6.3 | 12.6 | 371.7 | 1068.7 | 200 | 2000 | 30 | 100 | 5.0 | 5.0 | 5.0 |
| EX. 9-40 | 262.7 | 6.3 | 12.6 | 371.7 | 1068.7 | 200 | 2000 | 30 | 30 | 5.0 | 5.0 | 5.0 |

INDUSTRIAL APPLICABILITY

The present invention provides a coffee beverage having, regardless of a liquid temperature of the beverage, reduced bitterness and little aftertaste. Accordingly, the industrial applicability of the present invention is high.

The invention claimed is:

1. A packed coffee beverage comprising:
   a content of guaiacol of 100 to 550 µg/L;
   a content of furfuryl methyl sulfide of 25 to 1,000 µg/L; and
   a content of p-ethylphenol of 2 to 20 µg/L,
wherein the beverage further comprises at least one of the following:
   (i) a content of furfuryl mercaptan of 1,800 to 5,000 µg/L;
   (ii) a content of furfuryl methyl disulfide of 25 to 300 µg/L; and
   (iii) a content of furfuryl thioacetate is of 25 to 300 µg/L.

2. The packed coffee beverage according to claim 1, wherein the content of furfuryl methyl sulfide in the beverage is 150 to 500 µg/L.

3. The packed coffee beverage according to claim 1, wherein the beverage is black coffee.

4. The packed coffee beverage according to claim 1, wherein a Brix value of the beverage is 0.4 or more.

5. The packed coffee beverage according to claim 1, wherein the beverage is packed in a re-sealable lidded container.

6. The packed coffee beverage according to claim 2, wherein the beverage is black coffee.

7. The packed coffee beverage according to claim 2, wherein a Brix value of the beverage is 0.4 or more.

8. The packed coffee beverage according to claim 2, wherein the beverage is packed in a re-sealable lidded container.

9. A method of producing a packed coffee beverage, comprising:
   (i) adjusting a content of guaiacol in the beverage to 100 to 550 µg/L;
   (ii) adjusting a content of furfuryl methyl sulfide in the beverage to 25 to 1,000 µg/L;
   (iii) adjusting a content of p-ethylphenol in the beverage to 2 to 20 µg/L;
   (iv) adjusting at least one of the following in the beverage:
      (a) a content of furfuryl mercaptan to 1,800 to 5,000 µg/L;
      (b) a content of furfuryl methyl disulfide to 25 to 300 µg/L; and
      (c) a content of furfuryl thioacetate to 25 to 300 µg/L, and
   (v) packing the beverage.

* * * * *